United States Patent
Martin et al.

(10) Patent No.: US 10,674,412 B2
(45) Date of Patent: Jun. 2, 2020

(54) TELECOMMUNICATIONS APPARATUS AND METHODS

(71) Applicant: Sony Corporation, Tokyo (JP)

(72) Inventors: Brian Alexander Martin, Basingstoke (GB); Yuxin Wei, Basingstoke (GB); Hideji Wakabayashi, Basingstoke (GB); Shinichiro Tsuda, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/303,146

(22) PCT Filed: Apr. 12, 2017

(86) PCT No.: PCT/EP2017/058784
§ 371 (c)(1),
(2) Date: Nov. 20, 2018

(87) PCT Pub. No.: WO2017/198394
PCT Pub. Date: Nov. 23, 2017

(65) Prior Publication Data
US 2019/0306767 A1 Oct. 3, 2019

(30) Foreign Application Priority Data
May 20, 2016 (EP) .................................... 16170731

(51) Int. Cl.
*H04B 7/00* (2006.01)
*H04W 36/00* (2009.01)
(Continued)

(52) U.S. Cl.
CPC ....... *H04W 36/0085* (2018.08); *H04W 24/10* (2013.01); *H04W 36/0083* (2013.01);
(Continued)

(58) Field of Classification Search
CPC ......... H04W 36/0016; H04W 36/0061; H04W 36/0066; H04W 36/0077
(Continued)

(56) References Cited

U.S. PATENT DOCUMENTS 7,583,633 B2 * 9/2009 Woo .................. H04W 36/0061
370/320
8,731,543 B2 * 5/2014 Jung ...................... H04W 24/10
455/422.1
(Continued)

FOREIGN PATENT DOCUMENTS

WO 2016/003336 A1 1/2016
WO 2016/206998 A1 12/2016

OTHER PUBLICATIONS

3GPP TS 36300 V13.3.0 (Mar. 2016), Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Mar. 2016, pp. 1-295.
(Continued)

*Primary Examiner* — Dmitry Levitan
(74) *Attorney, Agent, or Firm* — Xsensus LLP

(57) ABSTRACT

A method of evaluating whether to handover a terminal device from communicating with a first network infrastructure element associated with a first communication cell to communicating with a second network infrastructure element associated with a second communication cell in a wireless telecommunications system. The method includes establishing an indication of radio conditions associated with a path between the terminal device and the first network infrastructure element; and establishing an indication of a second measurement of radio conditions associated with a communication path between the terminal device and the second network infrastructure element; and determining
(Continued)

whether to handover the terminal device from communicating with the first network infrastructure element to the second network infrastructure element based on a comparison of the indication of the first measurement of radio conditions and the indication of the second measurement of radio conditions.

20 Claims, 5 Drawing Sheets

(51) Int. Cl.
*H04W 36/04* (2009.01)
*H04W 36/14* (2009.01)
*H04W 24/10* (2009.01)

(52) U.S. Cl.
CPC ....... *H04W 36/0094* (2013.01); *H04W 36/04* (2013.01); *H04W 36/14* (2013.01)

(58) Field of Classification Search
USPC .................................. 370/310, 328, 331, 332
See application file for complete search history.

(56) References Cited

U.S. PATENT DOCUMENTS

| | | | | |
|---|---|---|---|---|
| 9,674,853 B2* | 6/2017 | Faccin | ............... | H04W 72/0406 |
| 9,768,847 B2* | 9/2017 | Frenger | ................ | H04B 7/0617 |
| 9,854,478 B2* | 12/2017 | Ozturk | .............. | H04W 36/0022 |
| 10,321,363 B2* | 6/2019 | Bergstrom | ........... | H04B 7/0619 |
| 10,383,025 B2* | 8/2019 | Lim | ........................ | H04W 36/38 |
| 2017/0215117 A1* | 7/2017 | Kwon | ...................... | H04B 7/04 |

OTHER PUBLICATIONS

Ericsson, "Mobility based on DL and UL measurements," Tdoc R2-163999, 3GPP TSG-RAN WG2 #94, Nanjing, China, May 23-27, 2016, pp. 1-3.

Holma, H. and Toskala, A., "LTE for UMTS: OFDMA and SC-FDMA Based Radio Access," First published:Mar. 31, 2009, Copyright © 2009 John Wiley & Sons, Ltd,Print ISBN:9780470994016, pp. 1-8.

Huawei, Hisilicon, "Considerations on New Radio Operation for Ultra Dense Networks," R1-162164, 3GPP TSG RAN WG1 Meeting #84bis, Busan, Korea, Apr. 11-15, 2016, pp. 1-7.

NTT DOCOMO, "New SID Proposal: Study on New Radio Access Technology," RP-160671, 3GPP TSG RAN Meeting #71, Göteborg, Sweden, Mar. 7-10, 2016.

Samsung, "Beam level management <-> Cell level mobility," R2-162210, 3GPP TSG-RAN WG2 Meeting #93bis, Dubrovnik, Croatia, Apr. 11-15, 2016, pp. 1-4.

Sony, "Early Handover solutions," R2-1700142, 3GPP TSG RAN WG2 NR Ad Hoc, Spokane, USA, Jan. 17-19, 2017, pp. 1-4.

International Search Report and Written Opinion for International Application No. PCT/EP2017/058784, dated Jun. 28, 2017.

* cited by examiner

TELECOMMUNICATIONS APPARATUS AND METHODS

CROSS-REFERENCE TO RELATED APPLICATIONS

This application is a National Stage Application based on PCT/EP2017/058784, filed on 12 Apr. 2017, and claims priority to European Patent Application No. 16170731.0, filed on 20 May 2016, the entire contents of which being in herein by reference.

BACKGROUND

Field

The present disclosure relates to telecommunications apparatus and methods, and in particular to methods and apparatus for controlling handover procedures in wireless telecommunications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices have different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G network). One particular area where new approaches may be helpful is in relation to handovers between network nodes responsible for communicating with a terminal device, which may be referred to as mobility management. It will be appreciated handovers may result from a device physically moving between coverage areas of different cells or from changing radio conditions associated with different cells for a static device, and the term mobility management may be used for both scenarios.

With current mobile telecommunications systems, such as those based on the 3GPP defined UMTS and Long Term Evolution (LTE) based architectures, handover procedures are carried out on the basis of measurements of downlink signals broadcast by each of the network nodes. These measurements are performed by terminal devices and network node selection, reselection or handover is then performed on the basis of these measurements so as to allow each terminal device to communicate with the network.

Existing approaches for handling mobility, with the associated measurement report signalling, handover signalling and evaluation procedures, however, results in relatively high power consumption by a terminal device and require terminal devices to comprise relatively complex equipment for performing such measurements over a range of different radio frequencies. This results in lower terminal device battery life. In addition, existing handover procedures require a relatively large number of messages to exchanged, which results in a relatively high control signalling overhead and increased chance of handover failure, particularly in the case of small cells and/or fast moving terminal devices, because of the time taken to perform the measurements and signalling.

In view of these drawbacks there is a desire to provide for new approaches for handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
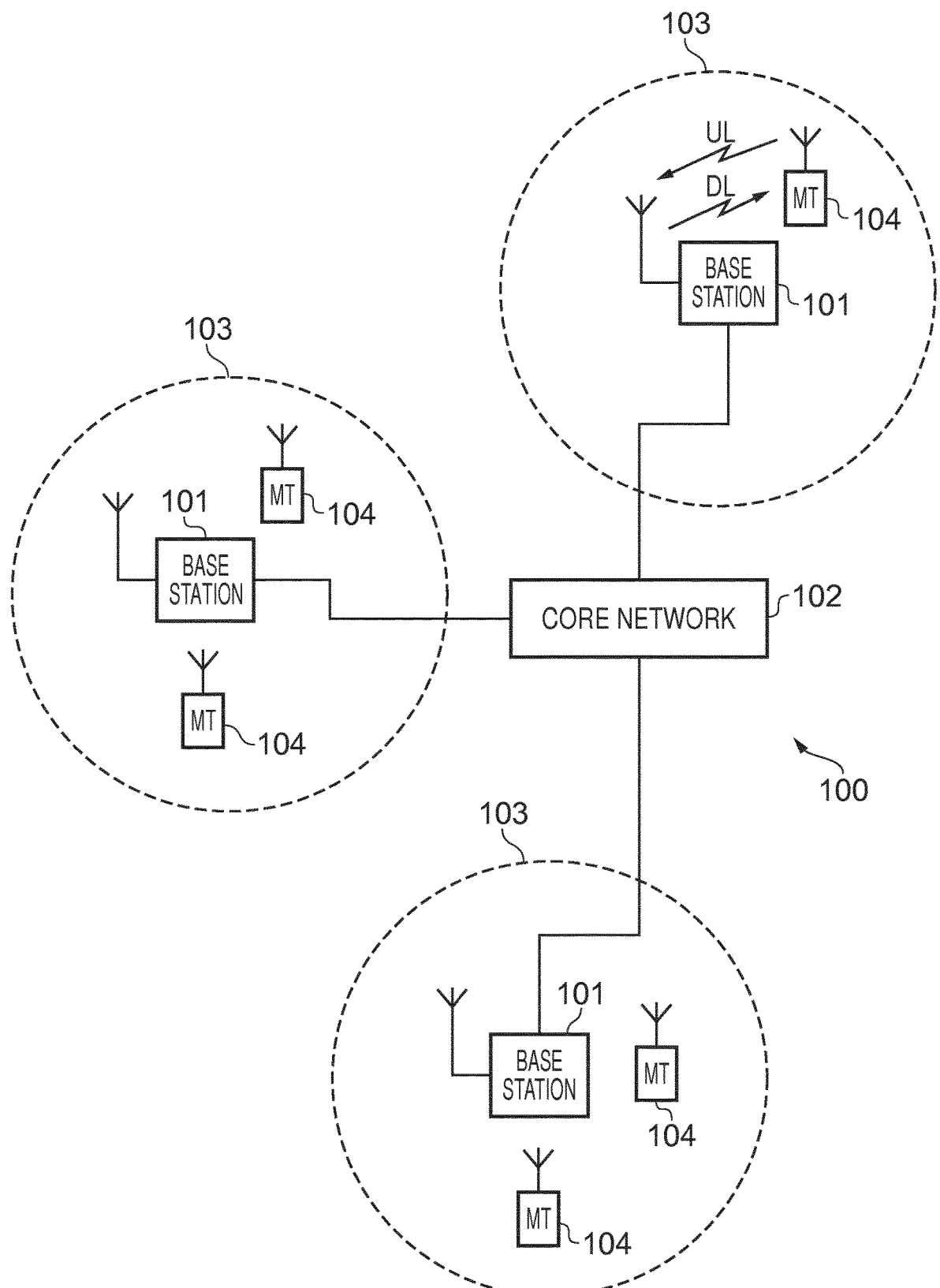
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
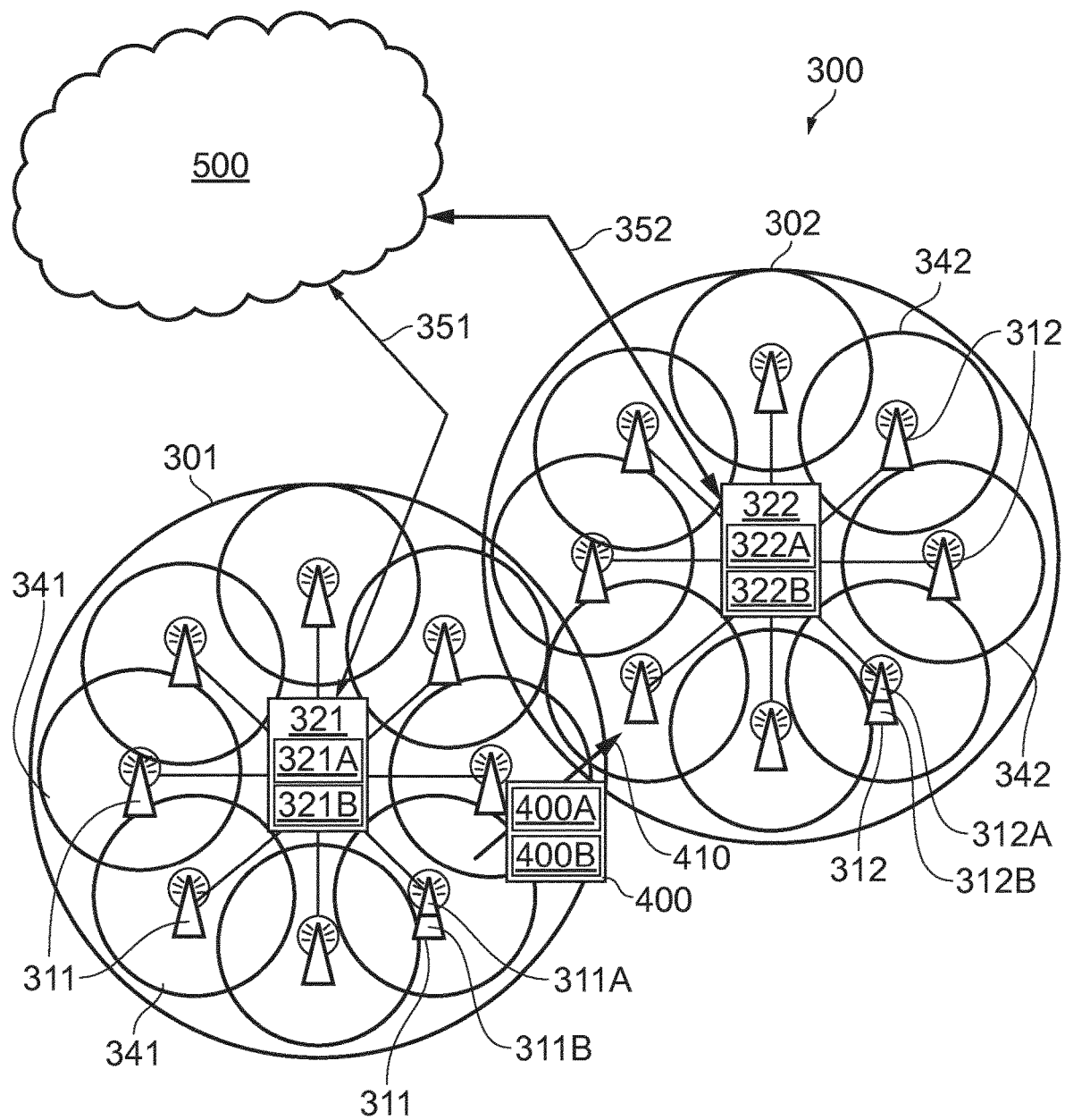
FIG. 2 schematically represents some elements of a wireless telecommunications network/system in accordance with certain embodiments of the disclosure.

FIG. 2 is a schematic diagram illustrating a network architecture for a new RAT wireless mobile telecommunications network/system 300 based on previously proposed approached and which may be adapted to provide functionality in accordance with embodiments of the disclosure describes herein. The new RAT network 300 of represented in FIG. 2 comprises a first communication cell 301 and a second communication cell 302. Each communication cell 301, 302, comprises a controlling node (centralised unit) 321, 322 in communication with a core network component 500 over a respective wired or wireless link 351, 352. The respective controlling nodes 321, 322 are also each in communication with a plurality of distributed units (radio access nodes/remote transmission and reception points) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective control nodes 321, 322 and their associated distributed units 311, 312 may be broadly considered to provide functionality corresponding to base stations of FIG. 1.

A terminal device 400 is represented in FIG. 2 with the coverage area of the first communication cell 301. This terminal device 400 may thus exchange signalling with the first controlling node 321 in the first communication cell via one of the distributed units 311 associated with the first communication cell 301. For simplicity the present description assumes communications for a given terminal device are routed through one of the distributed units, but it will be appreciated in some implementations communications associated with a given terminal device may be routed through more than one this to be to units, for example in a soft handover scenario. That is to say, references herein to communications being routed through one of the distributed units should be interpreted references to the occasion being routed through one or more of the distributed units. The controlling node 321 is responsible for determining which of the distributed units 311 spanning the first communication cell 301 is responsible for radio communications with the terminal device 400 at any given time. Typically this will be based on measurements of radio channel conditions between the terminal device 400 and respective ones of the distributed units 311. In at least some implementations the involvement of the distributed units is transparent to the terminal device 400. That is to say, the terminal device is not aware of which distributed unit is responsible for routing communications between the terminal device 400 and the controlling node 321 of the communication cell 301 in which the terminal device is currently operating. That is to say, so far as the terminal device is aware, it simply transmits uplink data to the controlling node 321 and receives downlink data from the controlling node 321 and the terminal device has no awareness of the involvement of the distributed units 311. In other embodiments, a terminal device may be configured with one or more of the distributed nodes and be aware of which is distributed unit(s) are involved in its communications. Switching and scheduling of the one or more distributed units is done at the network controlling unit based on measurements by the distributed units of the terminal device uplink signal or measurements taken by the terminal device and reported to the controlling unit via one or more distributed units.

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 400 comprises a transceiver unit 400A for transmission and reception of wireless signals and a processor unit 400B configured to control the terminal device 400. The processor unit 400B may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A for transmission and reception of communications between the respective controlling nodes 321, 322 and distributed units 312, 322 within their respective communication cells 301, 302 (these communications may be wired or wireless). Each controlling nodes 321, 322 further comprises a processor unit 321B, 322B configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units 311, 312 in this example are functionally identical but serve the different parts of the respective communications cells 301, 302 as schematically indicated in FIG. 2. Each distributed unit 311, 312 comprises a transceiver unit 311A, 312A for transmission and reception of communications between the respective distributed units 311, 312 and their associated controlling node 321, 322 and also for transmission and reception of wireless radio communications between the respective distributed units 311, 312 and any terminal device they are currently supporting. Each distributed unit 311, 312 further comprises a processor unit 311B, 312B configured to control the operation of the distributed unit 311, 312 in accordance with the principles described herein. The respective processor units 311B, 312B of the distributed units may again comprise various sub-units. These sub-units may be implemented as discrete hardware elements or as appropriately configured functions of the processor unit. Thus, the respective processor units 311B, 312B may comprise a processor unit which is suitably configured/programmed to provide the desired functionality described herein using conventional programming/configuration techniques for equipment in wireless telecommunications systems. The respective transceiver units 311A, 312A and processor units 311B, 312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

As discussed above, with conventional telecommunications systems, mobility management is performed on the basis of measurements by a terminal device of downlink signals broadcast by radio network access points (i.e. base stations in an LTE context). To help address these issues in the telecommunications system 300 of FIG. 2, rather than the terminal device 400 performing measurements on downlink signalling transmitted by radio access nodes for the network, the terminal device 400 instead transmits reference signalling which can be measured by radio access nodes in the communication cell associated with the controlling node to which the terminal devices is currently connected. Based on these measurements, the controlling node for the communication cell may determine which of the (one or more) distributed units/radio network access nodes is most appropriate for supporting communications between the controlling node and the terminal device, and configure their operation accordingly. The specific manner in which the controlling nodes are configured to route communications through the desired distributed unit(s) for a given terminal device is not significant to the principles described herein.

Thus, the radio/channel conditions associated with a communication path between a terminal device and respective ones of the distributed units in a communication cell in which the terminal device 400 is operating may be determined based on measurements of a characteristic of uplink reference signalling transmitted by the terminal device and received by the respective ones of the distributed units. There are a number of different characteristics of uplink reference signalling that may be measured to determine an indication of radio channel conditions associated with a radio path between the terminal device and each respective radio network access nodes/distributed units receiving the reference signalling in the communication cell in which the terminal device is operating. For example, the measured characteristic may be an indication of the received signal strength or quality of the reference signalling, and the controlling node 321 may control the radio access node reporting the highest signal strength or quality of the reference signalling to be the serving node for the terminal device. As a more specific example, the signal strength or quality of a known sequence of reference symbols of the reference signalling could be the measured characteristic. Furthermore, the controlling node may also take other information into account in addition to the indications of the relevant reference signal characteristic measurements received from the various radio network access nodes in the selection of the serving node, for example load balancing.

In accordance with certain embodiments of the disclosure, in addition to using references signalling from the terminal device to help a controlling node determine which is the most appropriate distributed unit/radio access point through which to route communications to and from a terminal device operating within the controlling node's communication cell, uplink reference signalling may also be used to support handover procedures in the wireless telecommunications system 300.

As discussed above, the terminal device 400 represented in FIG. 2 is communicating with the controlling node 321 of communication cell 301 via one of the distributed units 311 selected by the controlling node based on measurements of uplink reference signalling from the terminal device 400 by respective ones of the distributed units 311. However, it is assumed here the terminal device is moving in the direction indicated by the arrow 410 so that it is in the process of moving out of coverage of the first communication cell 301, and into coverage of the second communication cell 302 associated with the second controlling node 322. Accordingly, the terminal device 400 should be handed over from the first controlling node 321 associated with the first communication cell 301 to the second controlling node 322 associated with the second communication cell 302.

Figure 3:
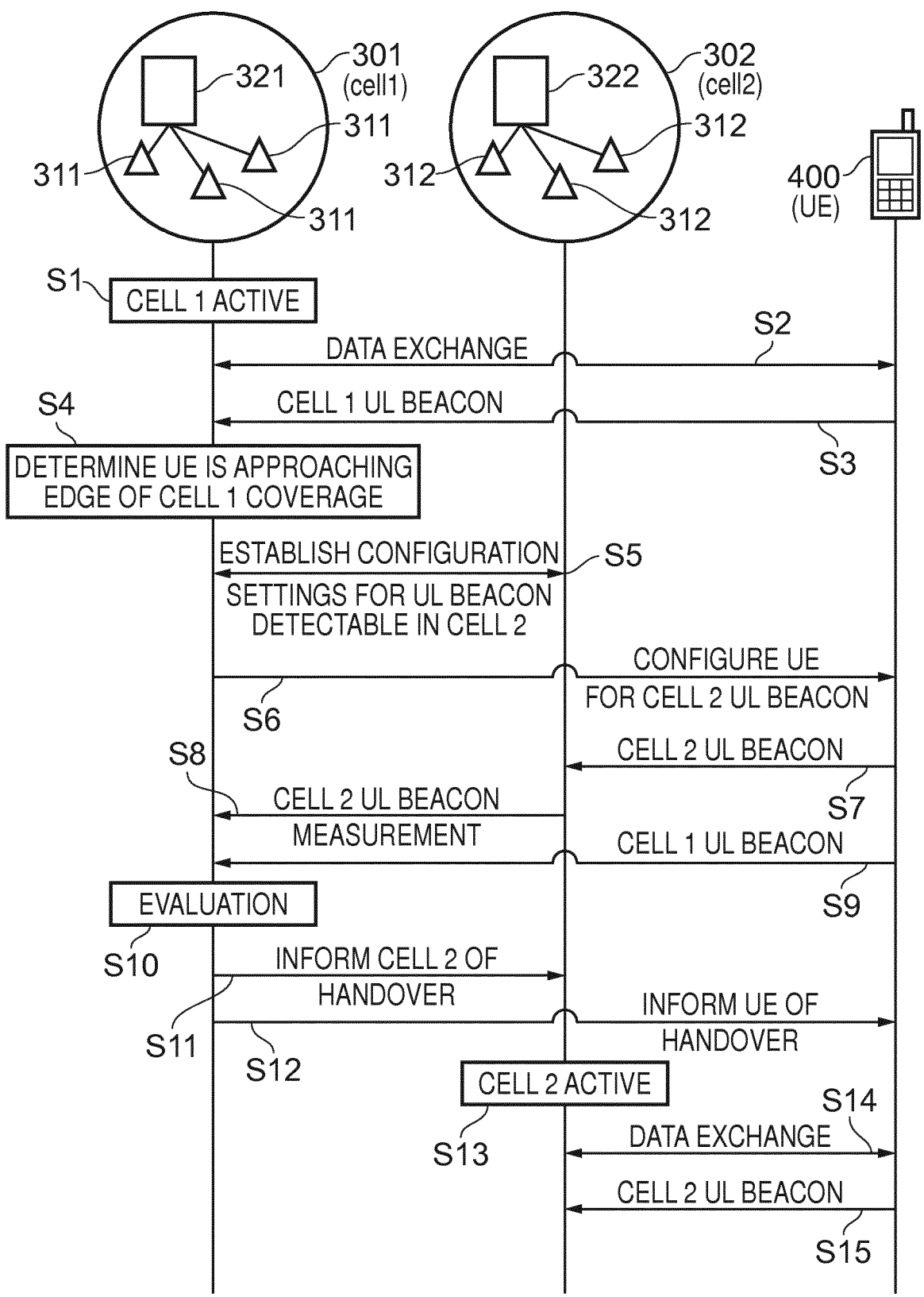
FIGS. 3 to 5 are ladder diagrams schematically representing some operating aspect of wireless telecommunications networks/systems in accordance with certain embodiments of the disclosure.

FIG. 3 is a ladder diagram schematically representing some operating aspects of the wireless telecommunications system 300 of FIG. 2 operating in accordance with certain embodiments of the disclosure. In particular, the diagram represents operations and signalling exchange associated with the terminal device 400, the elements representing the first communication cell 301 (i.e. the controlling unit 321 and its connected radio access nodes 311) and elements representing the second communication cell 302 (i.e. the controlling unit 322 and its connected radio access nodes 312). The first communication cell 301 may sometimes be referred to herein as cell 1 and the second communication cell 302 may sometimes be referred to as cell 2.

The processing represented in FIG. 3 starts in step S1 in which it is assumed the terminal device 400 is active on cell 1 (i.e. the terminal device is within the coverage area of cell 1 and connected to the first controller unit 321), which is the situation schematically represented in FIG. 2.

As schematically represented in step S2, when the terminal device is active on cell 1 it may exchange data with the network via the controlling node 321. This exchange of data may comprise uplink and downlink transmissions of user plane data and control plane data supporting with the operation of the terminal device within the first communication cell 301. This aspect of the operation may be performed in accordance with any proposed techniques for exchanging data in a wireless telecommunications network of the kind represented in FIG. 2. It will be appreciated the specific nature and content of the data exchanges step S2 is not significant to the principles described herein.

As noted above, the wireless telecommunications network of FIG. 2 is assumed to be based on one of the proposed new RAT network architectures in which a cell comprises a controlling network infrastructure element (i.e. the control unit 321 in cell 1) and a group of radio network access nodes (i.e. the distributed units 311). The radio network access nodes provide a wireless access interface for the terminal device and are each communicatively coupled to their controlling network infrastructure element. The specific radio network access node supporting the terminal device 400 may be determined by the controlling network infrastructure element in accordance with any proposed techniques, for example based on uplink reference/beacon signalling transmitted by the terminal device and received by various ones of the radio network access nodes. It may be expected the presence of the radio access nodes within the communication path between the terminal device 400 and the controlling network infrastructure element will be transparent to the terminal device 400. That is to say, in this example implementation the terminal device is not aware, and does not take account of, the presence of the radio access nodes in its operations (although as noted above, in other implementations the terminal device may be aware of the distributed unit(s) being used). Because of this the radio access nodes 311 and the controlling infrastructure element 321 are schematically grouped together as a single node in the ladder diagram of FIG. 3 (in effect the left-hand node of FIG. 3 simply corresponds with the communication cell 301). Similarly, the radio access nodes 312 associated with the second controlling network infrastructure element 322 are schematically grouped together as a single node in the ladder diagram of FIG. 3 (so that in effect the middle node of FIG. 3 corresponds with the communication cell 302).

As schematically indicated in step S3, while the terminal device 400 is active on cell 1 it is configured to transmit uplink reference signalling/reference signal, to allow for measurements of radio conditions associated with a communication path between the terminal device 400 and the first network infrastructure element 321. As noted above, a characteristic of the reference signalling received by the various radio access nodes 311 in the first communication cell 301 may be communicated back to the controlling network infrastructure element 321 to allow the controlling network infrastructure element 321 to determine which of the radio access nodes 311 should support radio communications for the terminal device. For example, the radio access node associated with the best measurements of the uplink reference signalling, for example in terms of said power or received quality, may be selected as the radio access node through which communications with the terminal device are routed. More generally, it will be appreciated the specific algorithm applied to determine which radio access node to use is not significant to the principles described herein. It will further be appreciated the specific characteristics of the uplink reference signalling/beacon signalling are also not significant to the principles described herein. What is relevant is that the signalling allows the controlling network infrastructure element 321 for the first communication cell 301 in which the terminal device 400 is operating to establish an indication of a measurement of radio conditions associated with a communication path between the terminal device and the controlling network infrastructure element 321. The uplink reference signalling of step S3 may, for example, be transmitted in accordance with a predefined repeating schedule to allow the first network infrastructure element 321 to monitor radio conditions associated with its communications with the terminal device on an ongoing basis.

In step S4 it is assumed the first network infrastructure equipment 321 determines from the uplink reference signalling received in step S3 that the terminal device 400 is approaching the edge of the coverage area provided by cell 1. This may be because the terminal device 400 is moving, as schematically represented by the arrow labels 410 in FIG. 2, or because the coverage area provided by cell 1 shrinking, for example because of worsening radio conditions.

In step S5, in response to the determination in step S4 that the terminal device 400 is approaching the edge of the first communication cell, the first network infrastructure element communicates with the second network infrastructure element 322, for example via their respective links to the core network element 500, to establish a configuration setting which the terminal device 400 should use for its beacon/uplink reference signalling to be detected within cell 2. That is to say, the first and second network infrastructure elements communicate with one another so the first network infrastructure element can establish an appropriate configuration setting to be used by the terminal device 400 to allow for a measurement of radio conditions associated with a communication path between the terminal device and the second network infrastructure element in the second communication cell. For example, cell 1 may be operating in a first frequency band, while cell 2 may be operating in a different second frequency band. In this case the configuration setting may include information relating to the frequency on which the terminal device should transmit reference signalling to be received in cell 2.

More generally, a configuration setting for the measurement of radio conditions associated with a communication path between the terminal device and the second network infrastructure element may comprise one or more of: an indication of whether the measurement for the second cell is to be made in respect of uplink signalling or downlink signalling; an indication of one or more frequencies to be used for the measurement; an indication of a timing to be used for the measurement, for example a specific timeslot in which to transmit reference signalling, or synchronisation information for communications in the second communication cell; an indication of an identifier to be used by the terminal device in association with the measurement, for example a radio network temporary identifier (RNTI) or a specific code to allow the network infrastructure element 322 in the second communication cell 302 to identify reference signalling from the terminal device 400; an indication of a radio access technology to be used for the measurement, for example in case the different communication cells operate in accordance with different radio access technologies, and an indication of reference signalling to be used for the measurement, for example an indication of one or more signature sequences used for the reference signalling.

In step S6 the first network infrastructure equipment 321 communicates to the terminal device 400 an indication of the configuration setting to be used by the terminal device for uplink reference signalling to be detected within cell 2.

In response to this, as schematically indicated in step S7, the terminal device 400 transmits an uplink reference in accordance with the configuration settings received in step S6. This uplink reference signalling is received by respective ones of the radio network access nodes 312 in the second communication cell 302. The radio access nodes 312 receiving the reference signalling make appropriate measurements (e.g. by measuring the power and/or quality of the reference signalling) and forward these measurements to the controlling network infrastructure element 322 associated with the second communication cell 302. It will be appreciated the uplink reference signalling transmitted in step S7 for the second communication cell 302 corresponds closely with the uplink reference signalling transmitted in step S3 for the first communication cell 301, except for being transmitted with a different configuration setting in accordance with the configuration setting information received from the first network infrastructure equipment in step S6.

As schematically indicated in step S8, the network infrastructure element 322 in the second communication cell 302 forwards an indication of the uplink reference measurements made on cell 2 to the first network infrastructure element 301 (or to a core network element). In practice the second network infrastructure element 322 in the second communication cell 302 may be configured to simply transmit to the first network infrastructure element 321 in the first communication cell 301 an indication of the best measurement of the uplink reference signalling made by the different radio network access nodes 312 operating in the second communication cell 302 which received the uplink reference signalling in step S7.

As schematically indicated in step S9, the terminal device 400 in this example is shown to retransmit reference signalling on cell 1. The transmission may correspond with one of the regular repeating transmissions of the signalling represented in step S3, for example.

In step S10 the first network infrastructure element 321 in the first communication cell 301 evaluates whether or not the terminal device 400 should be handed over to the second communication cell 302. This evaluation is based on a comparison of radio channel conditions associated with the different cells based on measurements of uplink reference signalling from the terminal device in the different cells. For example, if the measurement of the uplink reference signalling transmitted in step S7 indicates there is a communication path between the terminal device 400 and the second network infrastructure elements 322 which is associated with better radio conditions than a communication path between the terminal device 400 and the first network infrastructure equipment 321, as determined from measurements of the uplink reference signalling on cell 1 in step S9 (or an earlier measurement, such as in step S3), the first network infrastructure element 321 may determine to handover communications with the terminal device from the first cell to the second cell. In general it will be appreciated this specific step in the process represented in FIG. 3 may be performed generally in accordance with conventional techniques for establishing when to initiate a handover based on a comparison of radio channel measurements.

In this example it is assumed in step S10 the first network infrastructure element 321 determines that it is appropriate to handover the terminal device to the second communication cell. Accordingly, in step S11 the first network infrastructure element 321 informs the second network infrastructure element 322 of the handover. This may, for example, involve the communication of information, for example context information for the terminal device 400, which will assist the second communication cell in taking over communications with the terminal device 400 from the first communication cell, and it may include requesting a configuration for from the second infrastructure element to be transmitted to the terminal device from the first infrastructure equipment in the handover command.

In step S12, the first network infrastructure element informs the terminal device of the handover, and this may involve the communication of information to allow the terminal device to configure itself to communicate with the second communication cell. The configuration information conveyed to the terminal device in step S12 may, for example, comprise at least one of: an indication of system information associated with the second network infrastructure element; an indication of one or more frequencies to be used for communicating with the second network infrastructure element; an indication of a timing, e.g. a synchronisation offset, associated with the second network infrastructure element/second communication cell 302; an indication of an identifier to be used by the terminal device for communicating with the second network infrastructure element (for example a radio network temporary identifier, RNTI); a random access configuration, a radio resource control, RRC, configuration (including for example, radio bearer configurations with physical channels, transport channels, logical channels, and measurement configurations to be enabled after handover) to be used for communicating with the second network infrastructure element; and an indication of a radio access technology to be used for communicating with the second network infrastructure element. Although not represented in FIG. 3, the first network infrastructure equipment 321 associated with the first communication cell 301 may obtain this information from the second network infrastructure equipment 322 associated with the second communication cell, for example in association with the signalling exchanged in step S5, or subsequent signalling exchange.

Thus, step S12 represents the end of the handover procedure represent as in FIG. 3, and the terminal device 400 is now active on cell 2, as schematically indicated by step S13. Subsequently, the terminal device may exchange data with the second communication cell (represented in step S14) and transmit uplink reference signalling to the second communication cell (represented in step S15) in a corresponding manner to that discussed above with reference to steps S2 and S3 for the communications with the first communication cell 301.

Thus, FIG. 3 represents a handover procedure in accordance with embodiments of the disclosure. One significant aspect of this procedure is that it allows a terminal device to be handed over from one communication cell to another communication cell when the different cells rely on different configuration settings for their respective channel condition measurements. This is achieved by having the first communication cell 301 establish a configuration setting to be used by the terminal device for a measurement of radio conditions associated with communications in a second communication cell, thereby allowing measurements of radio channel conditions to be made on both communication cells and a comparison of the measurements to be used for determining whether to handover the terminal device from one communication cell to the other.

It will be appreciated that the processing represented in FIG. 3 is merely one example, and different implementations may adopt different processing. For example, in other implementations the steps represented in FIG. 3 may be performed in a different order, and some steps may be omitted. For example, in some implementations there may be no step corresponding to step S9, and instead the evaluation in step S10 may be based on a measurement made in respect of previous uplink reference signalling, for example transmitted in step S3.

It will also be appreciated that whereas the example represented in FIG. 3 is based on two communication cells in which radio channel conditions are measured based on uplink reference signalling, similar principles may be used in scenarios in which one or other of the communication cells relies on a downlink signalling for radio channel condition measurements. For example, in some implementations a terminal device may be able to operate in both a new RAT communication cell and a conventional LTE-based communication cell. In this case radio condition measurements in the new RAT communication cell may be based on uplink reference signalling while radio condition measurements in the conventional LTE-based communication cell may be based on downlink reference signalling. In another implementation, both communication cells might operate in accordance with a new RAT, but one might simply be configured to undertake radio channel measurements based on downlink signalling with the other configured to undertake radio channel measurements based on uplink signalling. In either case, and regardless of whether the first communication cell (source communication cell) and the second communication cell (target communication cell) in a potential handover scenario rely on uplink or downlink reference signalling for measurements of radio conditions, the same principles in terms of having one communication cell provide a terminal device with configuration information to allow radio channel conditions to be measured in respect of a different communication cell can be applied.

Figure 4:
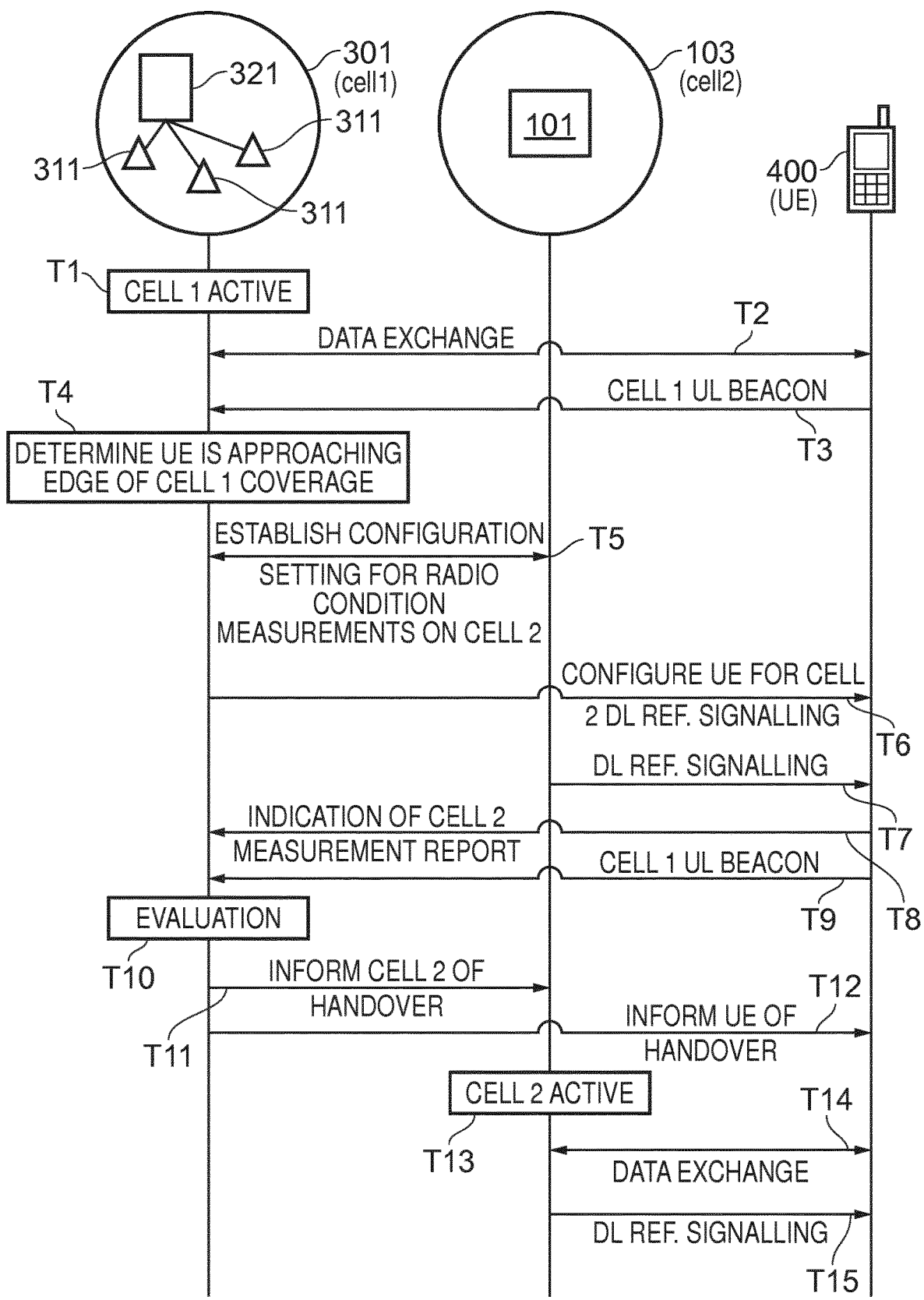

FIG. 4 is a diagram which is similar to, and will be understood from, FIG. 3, but shows a scenario in which a terminal device which is initially operating in the first communication cell 301 represented in Figures moves into the coverage area, and so is handed off to, a conventional LTE communication cell 103 of the kind represented in FIG. 1.

Steps T1, T2, T3 and T4 in FIG. 4 are similar to, and will be understood from, the corresponding steps S1, S2, S3 and S4 in FIG. 3.

In step T5, in response to the determination in step T4 that the terminal device 400 is approaching the edge of the first communication cell, the first network infrastructure element communicates with the base station 101 in the second communication cell 103 to establish a configuration setting which the terminal device 400 should use to detect downlink reference signalling transmitted by the base station 101 in accordance with the conventional downlink reference signalling based approaches for establishing radio channel condition measurements in LTE-based networks. The first network infrastructure equipment may obtain configuration setting information from the base station 101 via their respective links to a core network, or the first network infrastructure equipment 321 may simply determine the relevant information from system information transmitted by the base station 101.

In step T6 the first network infrastructure equipment 321 communicates to the terminal device 400 an indication of the configuration setting to be used by the terminal device for receiving downlink reference signalling, and making corresponding channel condition measurements, in respect of transmissions from the base station 101.

Although not shown in the example of FIG. 4, in some other implementations, the first network infrastructure equipment 321 may instruct/trigger the second network infrastructure equipment 322 to make transmissions to facilitate the terminal device's measurement of a characteristic of radio conditions associated with a communication path between the second network infrastructure equipment 322 and the terminal device 400. For example, the second network infrastructure equipment 322 may be triggered to begin transmitting downlink reference signalling to be measured by the terminal device. This may be useful, for example, in a situation in which the second cell is not associated with a conventional LTE cell (which typically broadcasts reference signalling on a continuous basis), but is based on a different radio access technology, such as UTRAN, GERAN, WLAN or a 5G new RAT, which might not involve the transmission of downlink reference signalling on a continuous basis. In some cases the second network infrastructure equipment may be triggered to begin transmitting other information, for example any system information that is required by the terminal device to make the measurement.

In response to this, as schematically indicated in step T7, the terminal device 400 configures itself to receive downlink reference signalling from the base station 101 of communication cell 2 in accordance with the configuration settings received in step S6. This downlink reference signalling may be received by the terminal device 400 in accordance with conventional LTE techniques, and be used by the terminal device to establish a measurement of radio conditions between the base station 101 and the terminal device 400, again in accordance with conventional LTE techniques.

Having made a measurement of the radio channel conditions between the base station 101 and the terminal device 400 using the reference signalling received in step T7, the terminal device proceeds to transmit a corresponding measurement report to the first network infrastructure element 321 in the first communication cell, as schematically indicated in step T8. The content and format of the measurement report may correspond with the conventional content and format of an LTE base measurement report or it may correspond to a new measurement report format which may contain measurements of neighbouring cells of a new RAT of LTE or any other RAT. In another implementation the terminal device may send a measurement report to the base station which then forwards an indication of the relevant information to the first network infrastructure element in the first cell 301.

As schematically indicated in step T9, the terminal device 400 in this example is shown to retransmit uplink reference signalling on cell 1. The transmission may correspond with one of the regular repeating transmissions of the signalling represented in step T3, for example.

In step T10 the first network infrastructure element 321 in the first communication cell 301 evaluates whether or not the terminal device 400 should be handed over to the second communication cell 103. This evaluation is based on a comparison of radio channel conditions associated with the different cells based on the measurements of uplink reference signalling received from the terminal device in step T9 and the measurement report indicating radio channel conditions between the base station 101 and the terminal device 400 received from the terminal device in step T8. This evaluation may again be performed having regard to the conventional principles for determining when a handover is appropriate having regard to radio channel condition measurements associated with different communications cells.

In this example it is assumed in step T10 the first network infrastructure element 321 determines that it is appropriate to handover the terminal device to the second communication cell. Accordingly, in step T11 the first network infrastructure element 321 informs the base station 101 of the handover. This signalling may correspond with conventional handover signalling in an LTE-based wireless telecommunications system.

In step T12, the first network infrastructure element informs the terminal device of the handover, and this may again be performed generally in accordance with conventional principles for handover signalling in an LTE based wireless telecommunications system.

Thus, step T12 represents the end of the handover procedure represent as in FIG. 4, and the terminal device 400 is now active on cell 2, as schematically indicated by step T13. Subsequently, the terminal device may exchange data with the second communication cell (represented in step T14) and continue to receive downlink reference signalling for channel measurement reporting on the second communication cell (represented in step T15) in accordance with conventional procedures for operating a terminal device in an LTE-based wireless telecommunications system.

Thus, FIG. 4 represents a handover procedure in accordance with embodiments of the disclosure where an initially active communication cell relies on uplink signalling for establishing radio conditions and a target communication cell relies on downlink signalling for establishing radio conditions. Again, a significant aspect of this procedure is that it allows a terminal device to be handed over from one communication cell to another communication cell where the cells rely on different configuration settings for their respective channel condition measurements. This is again achieved by having the first communication cell 301 establish a configuration setting to be used by the terminal device for a measurement of radio conditions associated with communications in a second communication cell, thereby allowing measurements of radio channel conditions to be made on both communication cells and a comparison to be used for determining whether to handover the terminal device from one communication cell to the other.

Figure 5:
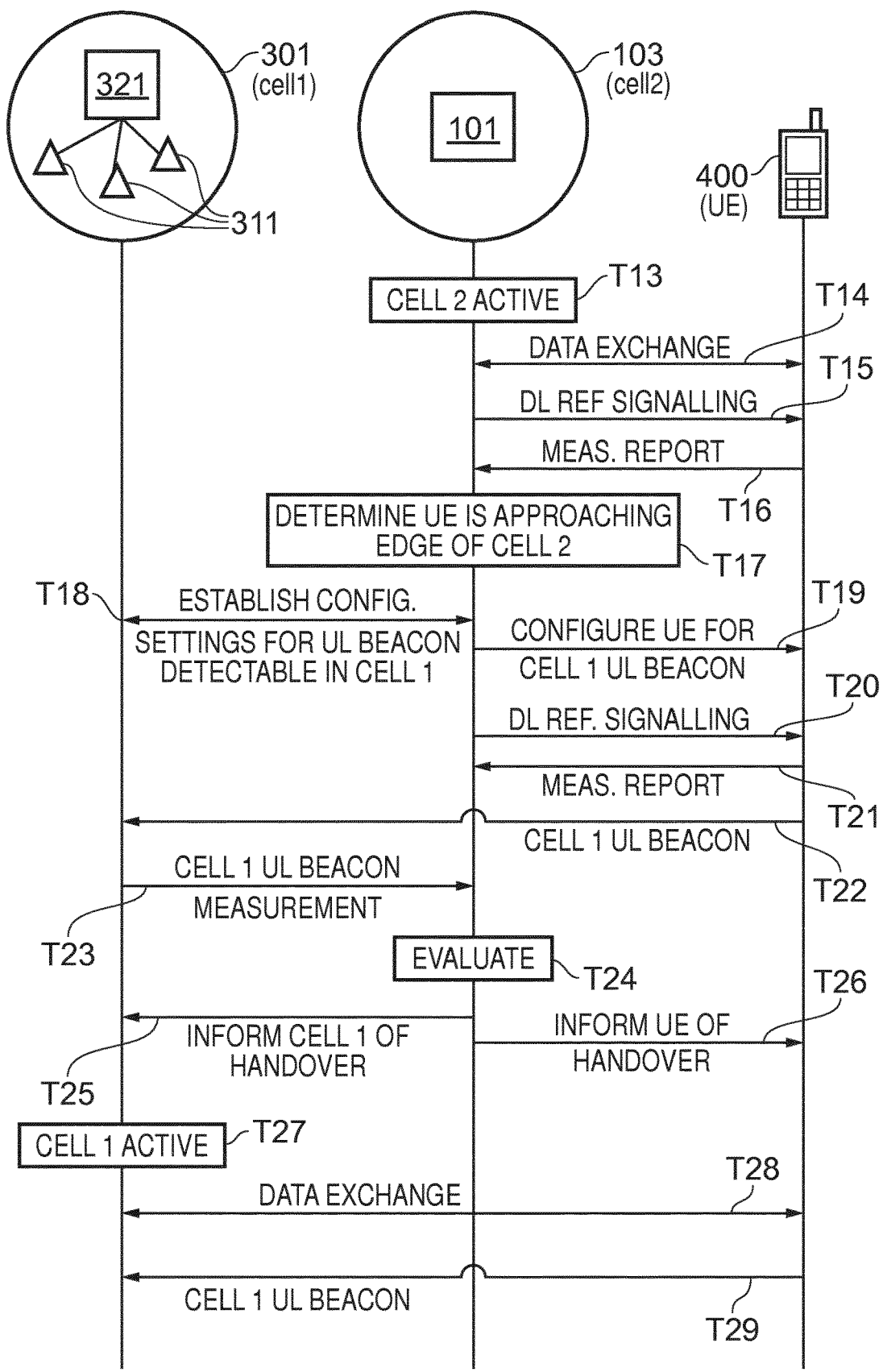

FIG. 5 is a diagram which is similar to, and will be understood from, FIG. 4, but shows a scenario in which the terminal device is initially active on the LTE-based cell 2 that relies on measurements of downlink signalling for establishing radio channel conditions in accordance with conventional LTE principles, but which then moves into the coverage area, and so is handed off to, the first communication cell 301 which, as discussed above, is a new RAT cell that relies on uplink reference signalling for measuring radio channel conditions.

Steps T13, T14 and T15 in FIG. 5 correspond with the correspondingly numbered steps in FIG. 4. In that respect, the processing represented in FIG. 5 may be considered a continuation of the processing represented in FIG. 4 in which the terminal device having been handed off from the first communication cell to the second communication cell, now moves back into the coverage area of the first communication cell.

In Step T16 the terminal device transmits a measurement report to the base station 101 relating to the downlink reference signalling received in step T15 in accordance with conventional LTE-based procedures.

In step T17 it is assumed the base station 101 determines from the measurement report received in step T16 that the terminal device 400 is approaching the edge of the coverage area provided by cell 2. Again this may be because the terminal device 400 is moving or because the coverage area provided by cell 2 shrinking, for example because of worsening radio conditions.

In step T18, in response to the determination in step T17, the base station communicates with the first network infrastructure element 321, for example via their respective links to a core network element of the system, to establish a configuration setting which the terminal device 400 should use for its beacon/uplink reference signalling to be detected within cell 1. That is to say, the base station 101 and first network infrastructure element 321 communicate with one another so the base station can establish an appropriate configuration setting to be used by the terminal device 400 to allow for a measurement of radio conditions associated with a communication path between the terminal device and the first network infrastructure element in the first communication cell. The information comprising the configuration setting may, for example, correspond with that discussed above with reference to FIG. 3.

In step T19 the base station 101 communicates to the terminal device 400 an indication of the configuration setting to be used by the terminal device for uplink reference signalling to be detected within cell 1.

In steps T20 and T21, the base station 101 transmits downlink reference signalling and receives a measurement report from the terminal device, for example as discussed above reference to steps T14 and T15.

In step T22 the terminal device 400 transmits uplink reference (reference) signalling in accordance with the configuration setting received in step T19. This uplink reference signalling is received by respective ones of the radio network access nodes 311 in the first communication cell 301. The radio access nodes 311 receiving the reference signalling make appropriate measurements (e.g. by measuring the power and/or quality of the reference signalling) and forward these measurements to the controlling network infrastructure element 321 associated with the first communication cell 301. It will be appreciated the uplink reference signalling transmitted in step T22 for the first communication cell 301 may corresponds closely with the uplink reference signalling discussed above in relation to FIGS. 3 and 4.

As schematically indicated in step T23, the network infrastructure element 321 in the first communication cell 301 forwards an indication of the uplink reference measurements made on cell 1 to the base station 101. In practice the first network infrastructure element 321 in the first communication cell 301 may be configured to simply transmit to the base station 101 in the second communication cell 103 an indication of the best measurement of the uplink reference signalling made by the different radio network access nodes 312 operating in the first communication cell 301 which received the uplink reference signalling in step T22.

In step T24 the base station evaluates whether or not the terminal device 400 should be handed over to the first communication cell 301.

This evaluation is based on a comparison of radio channel conditions associated with the different cells based on the measurements of uplink reference signalling received from the terminal device via the first network infrastructure element 321 in steps T22 and T23 and the measurement report received from the terminal device in step T21. This evaluation may again be performed having regard to the conventional principles for determining when a handover is appropriate having regard to radio channel condition measurements associated with different communications cells.

In this example it is assumed in step T24 the base station 101 determines that it is appropriate to handover the terminal device to the second communication cell. Accordingly, in step T25 the base station 101 informs the first network infrastructure element 321 of the handover decision.

In step T26, the base station informs the terminal device of the handover decision, and this may involve the communication of information to allow the terminal device to configure itself to communicate with the first communication cell. The configuration information conveyed to the terminal device in step T26 may, for example, comprise information discussed above in relation to the schemes represented in FIGS. 3 and 4.

Thus, step T26 represents the end of the handover procedure represent as in FIG. 3, and the terminal device 400 is now active on cell 1, as schematically indicated by step T27. Subsequently, the terminal device may exchange data with the first communication cell (represented in step T28) and transmit uplink reference signalling to the first communication cell (represented in step T29) in a corresponding manner to that discussed above with reference to FIG. 3.

Thus there has been described a method of evaluating whether to handover a terminal device from communicating with a first network infrastructure element associated with a first communication cell to communicating with a second network infrastructure element associated with a second communication cell in a wireless telecommunications system, wherein the method comprises: establishing an indication of a first measurement of radio conditions associated with a communication path between the terminal device and the first network infrastructure element; establishing, at the first network infrastructure element, a configuration setting to be used by the terminal device for a measurement of radio conditions associated with a communication path between the terminal device and the second network infrastructure element; conveying an indication of the configuration setting from the first network infrastructure element to the terminal device; establishing an indication of a second measurement of radio conditions associated with a communication path between the terminal device and the second network infrastructure element, wherein the second measurement of radio conditions is made in accordance with the configuration setting; and determining whether to handover the terminal device from communicating with the first network infrastructure element to the second network infrastructure element based on a comparison of the indication of the first measurement of radio conditions and the indication of the second measurement of radio conditions. At least one of the first measurement of radio conditions and the second measurement of radio conditions may be a measurement made in respect of uplink reference signalling transmitted by the terminal device.

Approaches in accordance with the principles described herein may thus help reduce the amount of measurement and reporting from the terminal when performing a handover between different control units in a new RAT architecture, and may also help provide a method to trigger measurements or uplink beacon (reference) signalling in a new cell when desired and based on uplink measurements taken by the network.

While certain example embodiments have been described in relation to particular example network architectures, it will be appreciated the same principles can be applied in respect of other network architectures. For example, in the network 300 schematically represented in FIG. 2, the coverage area of a cell is in effect defined by the aggregated coverage areas of the distributed units making up the cell, and each cell is individually associated with/hosted by a controlling node. That is to say, in the example of FIG. 2, there is a one-to-one mapping between controlling nodes and communication cells. However, in another example, a single controlling node may be responsible for/host more than one cell (i.e. more than one group of distributed units). In that regard, it may be noted the first communication cell and the secondary negated cell a be associated with the same network infrastructure element. That is to say, in some scenarios the first network infrastructure element associated with a first communication cell and the second network infrastructure element associated with a second communication cell may be the same network infrastructure element (i.e. a single network infrastructure element associated with (in the sense of hosting/controlling) two (or more) different cells.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of evaluating whether to handover a terminal device from communicating with a first network infrastructure element associated with a first communication cell to communicating with a second network infrastructure element associated with a second communication cell in a wireless telecommunications system, wherein the method comprises:
  establishing an indication of a first measurement of radio conditions associated with a communication path between the terminal device and the first network infrastructure element;
  establishing, at the first network infrastructure element, a configuration setting to be used by the terminal device for a measurement of radio conditions associated with a communication path between the terminal device and the second network infrastructure element;
  conveying an indication of the configuration setting from the first network infrastructure element to the terminal device;
  establishing an indication of a second measurement of radio conditions associated with a communication path between the terminal device and the second network infrastructure element, wherein the second measurement of radio conditions is made in accordance with the configuration setting; and
  determining whether to handover the terminal device from communicating with the first network infrastructure element to the second network infrastructure element based on a comparison of the indication of the first measurement of radio conditions and the indication of the second measurement of radio conditions.

Paragraph 2. The method of paragraph 1, wherein the first measurement of radio conditions is a measurement made in respect of uplink reference signalling transmitted by the terminal device.

Paragraph 3 The method of paragraph 1 or 2, wherein the second measurement of radio conditions is a measurement made in respect of uplink reference signalling transmitted by the terminal device.

Paragraph 4. The method of paragraph 3, further comprising the second network infrastructure element conveying an indication of the second measurement to the first network infrastructure element.

Paragraph 5. The method of paragraph 1 or 2, wherein the second measurement of radio conditions is a measurement made in respect of downlink reference signalling received by the terminal device.

Paragraph 6. The method of paragraph 5, further comprising the terminal device conveying an indication of the second measurement to the first network infrastructure element.

Paragraph 7. The method of paragraph 5 or 6, further comprising the terminal device conveying an indication of the second measurement to the second network infrastructure element.

Paragraph 8. The method of paragraph 7, further comprising the second network infrastructure element conveying an indication of the second measurement to the first network infrastructure element.

Paragraph 9. The method of paragraph 1, wherein the first measurement of radio conditions is a measurement made in respect of downlink reference signalling received by the terminal device.

Paragraph 10. The method of paragraph 9, further comprising the terminal device conveying an indication of the first measurement to the first network infrastructure element.

Paragraph 11. The method of paragraph 9 or 10, wherein the second measurement of radio conditions is a measurement made in respect of uplink reference signalling transmitted by the terminal device.

Paragraph 12. The method of paragraph 11, further comprising the second network infrastructure element conveying an indication of the second measurement to the first network infrastructure element.

Paragraph 13. The method of any preceding paragraph, wherein the configuration setting is established at the first network infrastructure element based on configuration setting information received by the first network infrastructure element from the second network infrastructure element.

Paragraph 14. The method of any preceding paragraph, wherein the configuration setting for the measurement of radio conditions associated with a communication path between the terminal device and the second network infrastructure element comprises one or more of:
  an indication of whether the measurement is a measurement of uplink signalling or a measurement of downlink signalling;
  an indication of one or more frequencies to be used for the measurement;
  an indication of a timing to be used for the measurement;
  an indication of an identifier to be used by the terminal device in association with the measurement;
  an indication of a radio access technology to be used for the measurement;

an indication of reference signalling to be used for the measurement.

Paragraph 15. The method of any preceding paragraph, further comprising the first network infrastructure element transmitting configuration information to be used by the terminal device for communicating with the second network infrastructure element in response to determining to handover the terminal device from communicating with the first network infrastructure element to the second network infrastructure element.

Paragraph 16. The method of paragraph 15, wherein the configuration information to be used by the terminal device for communicating with the second network infrastructure element comprises at least one of:
- an indication of system information associated with the second network infrastructure element;
- an indication of one or more frequencies to be used for communicating with the second network infrastructure element;
- an indication of a timing associated with the second network infrastructure element;
- an indication of an identifier to be used by the terminal device for communicating with the second network infrastructure element;
- a random access configuration;
- a radio resource control, RRC, configuration to be use for communicating with the second network infrastructure element; and
- an indication of a radio access technology to be used for communicating with the second network infrastructure element.

Paragraph 17. The method of any preceding paragraph, wherein the method is performed in response to a determination the terminal device is approaching an edge of the first communication cell associated with the first network infrastructure.

Paragraph 18. The method of any preceding paragraph, wherein radio communications in the first communication cell associated with the first network infrastructure are made in accordance with a first radio access technology and radio communications in the second communication cell associated with the second network infrastructure are made in accordance with a second, different, radio access technology.

Paragraph 19. The method of any preceding paragraph, wherein the first communication cell comprises the first network infrastructure element and a group of radio access nodes communicatively coupled to the first network infrastructure element and communications between the first network infrastructure element and the terminal device are routed through a selected one of the radio access nodes communicatively coupled to the first network infrastructure element.

Paragraph 20. The method of paragraph 19, wherein the first measurement of radio conditions associated with a communication path between the terminal device and the first network infrastructure element comprises a measurement of radio conditions associated with a radio path between the terminal device and the selected one of the radio access nodes communicatively coupled to the first network infrastructure element.

Paragraph 21. The method of any preceding paragraph, wherein the second communication cell comprises the second network infrastructure element and a group of radio access nodes communicatively coupled to the second network infrastructure element and communications between the second network infrastructure element and the terminal device are routed through a selected one of the radio access nodes communicatively coupled to the second network infrastructure element.

Paragraph 22. The method of paragraph 21, wherein the second measurement of radio conditions associated with a communication path between the terminal device and the second network infrastructure element comprises a measurement of radio conditions associated with a radio path between the terminal device and the selected one of the radio access nodes communicatively coupled to the second network infrastructure element.

Paragraph 23. A wireless telecommunications system comprising a terminal device, a first network infrastructure element associated with a first communication cell, and a second network infrastructure element associated with a second communication cell, wherein the terminal device, first network infrastructure element, and second network infrastructure element are configured to operate together to cause the wireless telecommunications system to perform a method of evaluating whether to handover the terminal device from communicating with the first network infrastructure element to communicating with the second network infrastructure element by:
- establishing an indication of a first measurement of radio conditions associated with a communication path between the terminal device and the first network infrastructure element;
- establishing, at the first network infrastructure element, a configuration setting to be used by the terminal device for a measurement of radio conditions associated with a communication path between the terminal device and the second network infrastructure element;
- conveying an indication of the configuration setting from the first network infrastructure element to the terminal device;
- establishing an indication of a second measurement of radio conditions associated with a communication path between the terminal device and the second network infrastructure element, wherein the second measurement of radio conditions is made in accordance with the configuration setting; and
- determining whether to handover the terminal device from communicating with the first network infrastructure element to the second network infrastructure element based on a comparison of the indication of the first measurement of radio conditions and the indication of the second measurement of radio conditions.

Paragraph 24. A method of operating a first network infrastructure element associated with a first communication cell in a wireless telecommunication system comprising the first network infrastructure element, a second network infrastructure element associated with a second communication cell, and a terminal device, wherein the method comprises:
- establishing an indication of a first measurement of radio conditions associated with a communication path between the terminal device and the first network infrastructure element;
- establishing a configuration setting to be used by the terminal device for a measurement of radio conditions associated with a communication path between the terminal device and the second network infrastructure element;
- conveying an indication of the configuration setting from the first network infrastructure element to the terminal device;
- receiving an indication of a second measurement of radio conditions associated with a communication path between the terminal device and the second network infrastructure element, wherein the second measurement of radio conditions is made in accordance with the configuration setting; and determining whether to handover the terminal device from communicating with the first network infrastructure element to the second network infrastructure element based on a comparison of the indication of the first measurement of radio conditions and the indication of the second measurement of radio conditions.

Paragraph 25. A first network infrastructure element associated with a first communication cell in a wireless telecommunication system comprising the first network infrastructure element, a second network infrastructure element associated with a second communication cell, and a terminal device, wherein the first network infrastructure element comprises a controller unit and a transceiver unit configured such that the first network infrastructure element is operable to establish an indication of a first measurement of radio conditions associated with a communication path between the terminal device and the first network infrastructure element;

establish a configuration setting to be used by the terminal device for a measurement of radio conditions associated with a communication path between the terminal device and the second network infrastructure element;

convey an indication of the configuration setting from the first network infrastructure element to the terminal device;

receive an indication of a second measurement of radio conditions associated with a communication path between the terminal device and the second network infrastructure element, wherein the second measurement of radio conditions is made in accordance with the configuration setting; and determine whether to handover the terminal device from communicating with the first network infrastructure element to the second network infrastructure element based on a comparison of the indication of the first measurement of radio conditions and the indication of the second measurement of radio conditions.

Paragraph 26. Integrated circuitry for first network infrastructure element associated with a first communication cell in a wireless telecommunication system comprising the first network infrastructure element, a second network infrastructure element associated with a second communication cell, and a terminal device, wherein the integrated circuitry comprises a controller element and a transceiver element configured to operate together such that the first network infrastructure element is operable to establish an indication of a first measurement of radio conditions associated with a communication path between the terminal device and the first network infrastructure element;

establish a configuration setting to be used by the terminal device for a measurement of radio conditions associated with a communication path between the terminal device and the second network infrastructure element;

convey an indication of the configuration setting from the first network infrastructure element to the terminal device;

receive an indication of a second measurement of radio conditions associated with a communication path between the terminal device and the second network infrastructure element, wherein the second measurement of radio conditions is made in accordance with the configuration setting; and determine whether to handover the terminal device from communicating with the first network infrastructure element to the second network infrastructure element based on a comparison of the indication of the first measurement of radio conditions and the indication of the second measurement of radio conditions.

Paragraph 27. A method of operating a second network infrastructure element associated with a second communication cell in a wireless telecommunication system comprising a first network infrastructure element associated with a first communication cell, the second network infrastructure element, and a terminal device, wherein the method comprises:

receiving from the first network infrastructure element a request for a configuration setting to be used by the terminal device for a measurement of radio conditions associated with a communication path between the terminal device and the second network infrastructure element;

conveying an indication of the configuration setting to the first network infrastructure element for onward transmission to the terminal device; and exchanging signalling with the terminal device to establish an indication of a measurement of radio conditions associated with a communication path between the terminal device and the second network infrastructure element, wherein the measurement of radio conditions is made in accordance with the configuration setting; and conveying the indication of the measurement of radio conditions associated with a communication path between the terminal device and the second network infrastructure element to the first network infrastructure equipment.

Paragraph 28. A second network infrastructure element associated with a second communication cell in a wireless telecommunication system comprising the second network infrastructure element, a first network infrastructure element associated with a first communication cell, and a terminal device, wherein the second network infrastructure element comprises a controller unit and a transceiver unit configured such that the second network infrastructure element is operable to receive from the first network infrastructure element a request for a configuration setting to be used by the terminal device for a measurement of radio conditions associated with a communication path between the terminal device and the second network infrastructure element;

convey an indication of the configuration setting to the first network infrastructure element for onward transmission to the terminal device; and exchange signalling with the terminal device to establish an indication of a measurement of radio conditions associated with a communication path between the terminal device and the second network infrastructure element, wherein the measurement of radio conditions is made in accordance with the configuration setting; and convey the indication of the measurement of radio conditions associated with a communication path between the terminal device and the second network infrastructure element to the first network infrastructure equipment.

Paragraph 29. Integrated circuitry for a second network infrastructure element associated with a second communication cell in a wireless telecommunication system comprising the second network infrastructure element, a first network infrastructure element associated with a first communication cell, and a terminal device, wherein the integrated circuitry comprises a controller element and a transceiver element configured to operate together such that the second network infrastructure element is operable to
- receive from the first network infrastructure element a request for a configuration setting to be used by the terminal device for a measurement of radio conditions associated with a communication path between the terminal device and the second network infrastructure element;
- convey an indication of the configuration setting to the first network infrastructure element for onward transmission to the terminal device; and
- exchange signalling with the terminal device to establish an indication of a measurement of radio conditions associated with a communication path between the terminal device and the second network infrastructure element, wherein the measurement of radio conditions is made in accordance with the configuration setting; and
- convey the indication of the measurement of radio conditions associated with a communication path between the terminal device and the second network infrastructure element to the first network infrastructure equipment.

Paragraph 30. A method of operating a terminal device in a wireless telecommunication system comprising the terminal device, a first network infrastructure element associated with a first communication cell and a second network infrastructure element associated with a second communication cell, wherein the method comprises:
- exchanging signalling with the first network infrastructure element to provide for a first measurement of radio conditions associated with a communication path between the terminal device and the first network infrastructure element,
- receiving from the first network infrastructure element an indication of a configuration setting to be used by the terminal device for a measurement of radio conditions associated with a communication path between the terminal device and the second network infrastructure element; and
- exchanging signalling with the second network infrastructure element to provide for a second measurement of radio conditions associated with a communication path between the terminal device and the second network infrastructure element in accordance with the configuration setting.

Paragraph 31. A terminal device for use in a wireless telecommunication system comprising the terminal device, a first network infrastructure element associated with a first communication cell and a second network infrastructure element associated with a second communication cell, wherein the terminal device comprises a controller unit and a transceiver unit configured such that the terminal device is operable to:
- exchange signalling with the first network infrastructure element to provide for a first measurement of radio conditions associated with a communication path between the terminal device and the first network infrastructure element,
- receive from the first network infrastructure element an indication of a configuration setting to be used by the terminal device for a measurement of radio conditions associated with a communication path between the terminal device and the second network infrastructure element; and
- exchange signalling with the second network infrastructure element to provide for a second measurement of radio conditions associated with a communication path between the terminal device and the second network infrastructure element in accordance with the configuration setting.

Paragraph 32. Integrated circuitry for a terminal device for use in a wireless telecommunication system comprising the terminal device, a first network infrastructure element associated with a first communication cell and a second network infrastructure element associated with a second communication cell, wherein the integrated circuitry comprises a controller element and a transceiver element configured to operate together such that the terminal device is operable to
- exchange signalling with the first network infrastructure element to provide for a first measurement of radio conditions associated with a communication path between the terminal device and the first network infrastructure element,
- receive from the first network infrastructure element an indication of a configuration setting to be used by the terminal device for a measurement of radio conditions associated with a communication path between the terminal device and the second network infrastructure element; and
- exchange signalling with the second network infrastructure element to provide for a second measurement of radio conditions associated with a communication path between the terminal device and the second network infrastructure element in accordance with the configuration setting.

REFERENCES

[1] Holma H. and Toskala A, "LTE for UMTS OFDMA and SC-FDMA based radio access", John Wiley and Sons, 2009

The invention claimed is:

1. A method of evaluating whether to handover a terminal device from communicating with a first network infrastructure element associated with a first communication cell to communicating with a second network infrastructure element associated with a second communication cell in a wireless telecommunications system, the second network infrastructure element neighboring the first network infrastructure element, wherein the method comprises:
- establishing, at the first network infrastructure element, a first measurement of radio conditions associated with a communication path between the terminal device and the first network infrastructure element;
- establishing, at the first network infrastructure element by communicating with the second network infrastructure element via their respective links to a core network element, a configuration setting to be used by the terminal device for a measurement of radio conditions associated with a communication path between the terminal device and the second network infrastructure element, wherein the configuration setting is established at the first network infrastructure element based on configuration setting information received by the first network infrastructure element from the second network infrastructure element;
conveying an indication of the configuration setting from the first network infrastructure element to the terminal device;
establishing, at the first network infrastructure element, a second measurement of radio conditions associated with a communication path between the terminal device and the second network infrastructure element, wherein the second measurement of radio conditions is made in accordance with the configuration setting; and
determining, at the first network infrastructure element, whether to handover the terminal device from communicating with the first network infrastructure element to the second network infrastructure element based on a comparison of the first measurement of radio conditions and the second measurement of radio conditions.

2. The method of claim 1, wherein the first measurement of radio conditions is a measurement made in respect of uplink reference signalling transmitted by the terminal device.

3. The method of claim 2, wherein the second measurement of radio conditions is a measurement made in respect of uplink reference signalling transmitted by the terminal device.

4. The method of claim 3, further comprising the second network infrastructure element conveying the second measurement to the first network infrastructure element.

5. The method of claim 2, wherein the second measurement of radio conditions is a measurement made in respect of downlink reference signalling received by the terminal device.

6. The method of claim 5, further comprising the terminal device conveying the second measurement to the first network infrastructure element.

7. The method of claim 5, further comprising the terminal device conveying the second measurement to the second network infrastructure element.

8. The method of claim 7, further comprising the second network infrastructure element conveying the second measurement to the first network infrastructure element.

9. The method of claim 1, wherein the first measurement of radio conditions is a measurement made in respect of downlink reference signalling received by the terminal device.

10. The method of claim 9, further comprising the terminal device conveying the first measurement to the first network infrastructure element.

11. The method of claim 9, wherein the second measurement of radio conditions is a measurement made in respect of uplink reference signalling transmitted by the terminal device.

12. The method of claim 11, further comprising the second network infrastructure element conveying the second measurement to the first network infrastructure element.

13. The method of claim 1, wherein the configuration setting for the measurement of radio conditions associated with a communication path between the terminal device and the second network infrastructure element comprises one or more of:
an indication of whether the measurement is a measurement of uplink signalling or a measurement of downlink signalling;
an indication of one or more frequencies to be used for the measurement;
an indication of a timing to be used for the measurement;
an indication of an identifier to be used by the terminal device in association with the measurement;
an indication of a radio access technology to be used for the measurement;
an indication of reference signalling to be used for the measurement.

14. The method of claim 1, further comprising the first network infrastructure element transmitting configuration information to be used by the terminal device for communicating with the second network infrastructure element in response to determining to handover the terminal device from communicating with the first network infrastructure element to the second network infrastructure element.

15. The method of claim 14, wherein the configuration information to be used by the terminal device for communicating with the second network infrastructure element comprises at least one of:
an indication of system information associated with the second network infrastructure element;
an indication of one or more frequencies to be used for communicating with the second network infrastructure element;
an indication of a timing associated with the second network infrastructure element;
an indication of an identifier to be used by the terminal device for communicating with the second network infrastructure element;
a random access configuration;
a radio resource control, RRC, configuration to be use for communicating with the second network infrastructure element; and
an indication of a radio access technology to be used for communicating with the second network infrastructure element.

16. The method of claim 1, wherein the method is performed in response to a determination the terminal device is approaching an edge of the first communication cell associated with the first network infrastructure.

17. The method of claim 1, wherein radio communications in the first communication cell associated with the first network infrastructure are made in accordance with a first radio access technology and radio communications in the second communication cell associated with the second network infrastructure are made in accordance with a second, different, radio access technology.

18. The method of claim 1, wherein conveying the indication of the configuration setting from the first network infrastructure element to the terminal device occurs after establishing the configuration setting at the first network infrastructure element based on the configuration setting information received by the first network infrastructure element from the second network infrastructure element.

19. A method of operating a terminal device in a wireless telecommunication system comprising the terminal device, a first network infrastructure element associated with a first communication cell and a second network infrastructure element associated with a second communication cell, the second network infrastructure element neighboring the first network infrastructure element, wherein the method comprises:
exchanging signaling between the terminal device and the first network infrastructure element to provide for a first measurement of radio conditions associated with a communication path between the terminal device and the first network infrastructure element,
receiving, at the terminal device, from the first network infrastructure element an indication of a configuration setting to be used by the terminal device for a measurement of radio conditions associated with a communication path between the terminal device and the second network infrastructure element, wherein the configuration setting is established at the first network infrastructure element based on configuration setting information received by the first network infrastructure element from the second network infrastructure element via their respective links to a core network element; and exchanging signaling between the terminal device and the second network infrastructure element to provide for a second measurement of radio conditions associated with a communication path between the terminal device and the second network infrastructure element in accordance with the configuration setting.

20. A terminal device for use in a wireless telecommunication system comprising the terminal device, a first network infrastructure element associated with a first communication cell and a second network infrastructure element associated with a second communication cell, the second network infrastructure element neighboring the first network infrastructure element, wherein the terminal device comprises a controller unit and a transceiver unit configured such that the terminal device is operable to:

exchange signaling between the terminal device and the first network infrastructure element to provide for a first measurement of radio conditions associated with a communication path between the terminal device and the first network infrastructure element, receive, at the terminal device, from the first network infrastructure element an indication of a configuration setting to be used by the terminal device for a measurement of radio conditions associated with a communication path between the terminal device and the second network infrastructure element, wherein the configuration setting is established at the first network infrastructure element based on configuration setting information received by the first network infrastructure element from the second network infrastructure element via their respective links to a core network element; and exchange signaling between the terminal device and the second network infrastructure element to provide for a second measurement of radio conditions associated with a communication path between the terminal device and the second network infrastructure element in accordance with the configuration setting.

* * * * *